United States Patent [19]

Huang

[11] Patent Number: 4,792,364

[45] Date of Patent: * Dec. 20, 1988

[54] PAINT DETACKIFICATION

[75] Inventor: Shu-Jen W. Huang, Schaumburg, Ill.

[73] Assignee: Nalco Chemical Company, Naperville, Ill.

[ * ] Notice: The portion of the term of this patent subsequent to Jun. 28, 2005 has been disclaimed.

[21] Appl. No.: 61,833

[22] Filed: Jun. 12, 1987

[51] Int. Cl.$^4$ .............................................. C02F 1/56
[52] U.S. Cl. ..................................... 134/38; 252/175; 252/DIG. 8; 210/727; 210/738; 210/917; 427/421
[58] Field of Search ................... 134/38, 10; 252/175, 252/DIG. 8; 210/732, 733; 427/421

[56] References Cited

U.S. PATENT DOCUMENTS

| | | | |
|---|---|---|---|
| 3,901,840 | 8/1975 | Irvin et al. | 134/38 |
| 3,959,554 | 5/1976 | Hick | 134/38 |
| 4,090,001 | 5/1978 | Mertweiller | 134/38 |
| 4,130,674 | 12/1978 | Roberts et al. | 210/735 |
| 4,185,970 | 1/1980 | Dean | 134/38 |
| 4,422,944 | 12/1983 | Selvarajan et al. | 210/735 |
| 4,440,647 | 4/1984 | Puchalsai | 134/38 |
| 4,472,284 | 9/1984 | Bolhofner | 210/735 |
| 4,481,116 | 11/1984 | Cabestany et al. | 210/735 |
| 4,490,417 | 12/1984 | Shindow et al. | 134/38 |
| 4,629,572 | 12/1986 | Leitz et al. | 210/735 |
| 4,637,824 | 1/1987 | Pominville | 55/85 |
| 4,656,059 | 4/1987 | Mizuno et al. | 210/735 |
| 4,753,738 | 6/1988 | Huang | 134/38 |

FOREIGN PATENT DOCUMENTS

| | | | |
|---|---|---|---|
| 2541293 | 8/1984 | France | 210/732 |
| 9054447 | 9/1972 | Japan | 210/735 |
| 0248286 | 12/1985 | Japan | 210/732 |

OTHER PUBLICATIONS

Pilot Study of Water Wash Spray Booth Detackifiers by Shu-Jen W. Huang, Society of Manufacturing Engineers, Conference, Sep. 22–25, 1986.
Japan Kokai Tokkyo Koho JP 61/108698 A2[86/108698], May 27, 1986, Appl. 84/230647, Nov. 1, 1984, Chemical Abstract 105:192911d.
Germany (East) DD228749 A1, Oct. 23, 1985, Appl. 268509, Oct. 18, 1984, Chemical Abstract 105:192911d.
Japan Kokai JP 49/134164 [74/134164], Dec. 24, 1974, Appl. or PR. 73 48,232, Apr. 26, 1973.

Primary Examiner—Asok Pal
Attorney, Agent, or Firm—John G. Premo; Anthony L. Cupoli; Donald G. Epple

[57] ABSTRACT

A paint spray booth detackifying composition which includes mixtures of; melamine-formaldehyde polymers and polyvinyl alcohol polymers; and mixtures of melamine-formaldahyde polymer, polyvinyl alcohol polymer and styrene-acrylate polymer.

10 Claims, No Drawings

PAINT DETACKIFICATION

FIELD OF THE INVENTION

The invention relates to paint spray detackifying compositions and the method of using them.

Dosages are given on an actives basis unless otherwise specified.

Molecular weight is defined to be weight average molecular weight.

BACKGROUND OF THE INVENTION

In the 1980's the paint technology in the automotive industry, as well as, industry in general has advanced from the utilization of low dispersion lacquers to high solids enamels. This has been due to a need to reduce solvent emission and disposal. These high solid enamels are particularly useful in basecoat/clearcoat technology.

As the paint technology has advanced, more emphasis has been on spray booth detackifiers as high solid enamels are much harder to detackify than low dispersion lacquers.

To satisfy these needs, the compositions of this application have been developed.

Thus, it is an object of this invention to provide a detackifier that can kill automotive basecoat/clearcoat paints and stay non-sticky throughout the whole process.

It is an object of this invention to provide a composition that will provide a detackified paint sludge having minimum volume and high dewaterability.

It is an object of the invention to provide a detackifier that will have low toxicity.

SUMMARY OF THE INVENTION

The invention includes a paint spray booth detackifying composition which includes melamine-formaldehyde polymer mixed with polyvinyl alcohol polymer. Generally, a ratio of melamine-formaldehyde to polyvinyl alcohol in the mixture should be within the ratio based on actives of 2.4:1 to 5.5:1, and more preferably within the weight ratio of 3.0:1 to 4.0:1.

The melamine-formaldehyde/polyvinyl alcohol composition may further include styrene acrylate polymer. In such a case, the ratio of polyvinyl alcohol to melamine-formaldehyde to styrene acrylate should preferably be within the ratio of 0.7:2.4:1 to 1.32:4.5:1 on a weight ratio basis based on actives.

For each of the above compositions, the initial dosage shall range from 25 ppm to 500 ppm of active polymer mixture. And a maintenance dosage shall range from 12:1 to 40:1 paint to product ratio.

THE DISCUSSION OF THE INVENTION

In practice, a suitable melamine-formaldehyde resin is provided under the trademark MAGNIFLOC 515C, a trademark of the American Cyanamid Company. Generally, suitable melamine formaldehyde resins should have a weight average molecular weight of at least 2,000 and be soluble in water at pH below 2.5. Preferably, the molecular weight will be in the range of 2,500–4,000.

A suitable styrene-acrylate resin is provided under the trademark ESICRYL R-11, a trademark of the Emulsion System Company or OPACIFIER 11, a trademark of the Essential Chemical Company for 2-propenoic acid, polymer with ethenylbenzene, ammonium salt (ie. styrene/anionic acrylate polymer). Styrene-acrylate resins generally can be used. However, the most preferred will have a molecular weight within the range of 50,000–100,000.

Suitable polyvinyl alcohol is VINOL 205, a trademark of the Air Product Company for a polyvinyl alcohol.

Generally, the styrene-acrylate polymer is prepared separately and packaged separately from the melamine-formaldehyde polymer. The two are then charged into the system. Procedure A is a procedure for producing a mixture of the melamine-formaldehyde and polyvinyl alcohol polymers. The styrene-acrylate can be used as purchased. Melamine-formaldehyde can also be used as purchased.

Preparation of Melamine Formaldehyde/Polyvinyl Alcohol

1. Into a clean tank, charge the first water increment. Begin agitation to achieve a vortex.

2. Adjust the water temperature to 63°–70° F. and maintain until Step #5.

3. Charge the polyvinyl alcohol resin slowly into the vortex. Do not allow the powder to float or form large clumps. If powder begins to float, increase the agitation to a maximum. Reduce the agitation speed if excessive foaming occurs.

4. When all the polyvinyl alcohol resin has been charged and dispersed (but not dissolved), reduce the agitation to medium speed.

5. Heat the batch slowly to 120°–130° F. and maintain until reaction has progressed nearly to completion.

6. Then, reduce and maintain the temperature at 110°–120° F. Reduce agitation speed to minimum to allow the final foam layer to break.

7. Then, start cooling batch to 80° F. and charge the rest of the water. Mix for 15 minutes.

8. When the temperature reaches 90° F., charge the melamine formaldehyde polymer over a 30 minute period. Mix the batch for 30 minutes after all the melamine formaldehyde polymer has been charged.

LABORATORY TEST

Laboratory tests were conducted using a clay/amine product which is a standard in the industry today, representing over 60% of the U.S. detackifying market for high density paint systems.

Desired amounts of detackifiers were added to the water manually or using a chemical pump to monitor the chemical demand. These detackifiers were allowed to mix in the tank through water circulation for 5 minutes. The paint being tested was then sprayed into the chamber at a rate of 2 ml/min through an air atomized spray gun located 12 inches above the center of the scrubbing section. An exhaust fan pulling air from the lower section of the scrubbing chamber helped the air flow through the water and increased scrubbing efficiency. This exhaust fan also aided in eliminating paint mist during the test and made the whole unit operable in that atmosphere. The test paint was sprayed for 10 minutes and the paint kill then tested for tackiness or stickiness. Tackiness or stickiness was determined by wetting the test runner's hand by the water solution in the test tank and taking a sample of the floating paint sludge from the water tank and squeezing and rubbing it slightly between his fingers until a degree of tackiness is determined. The test is somewhat subjective. However, that is the best method that is currently available.

In general, at the conclusion of a good paint kill, paint is continuously sprayed, and the paint sludge conditions tested every 10 minutes. At any given time, if any trace of tackiness of sludge is present, paint spray should be discontinued and the program re-examined. The amount of paint sprayed, the chemical dosage, and condition of sludge should be recorded.

Additional chemicals should be added and paint spray resumed. Repeat this process at least four times.

Let's take a hypothetical example of the test in order to see how the product maintenance ratio is calculated:

| mls of paint sprayed | mls of chemicals added | Comments |
| --- | --- | --- |
| 0 | 57 ml (or 3,000 ppm) | Start spraying initial kill #8 |
| 120 | 19 | Final kill #6 recharge chemicals |
| 60 | 19 | Recharge chemicals |
| 55 | 19 | Recharge chemicals |
| 67 | | Finish sprayed |

In this case, the initial charge of chemicals is 19 mls or 1,000 ppm (based on 5 gallons of water) and the product maintenance ratio is 3:1 paint/product.

In the following tests, the maintenance ratio represents the ratio of paint to product required to maintain acceptable levels of tackiness or stickiness for the paint kill.

Test 1

Paint: PPG URC-1000 is a trademark of PPG Industries for acrylic/melamine ester clear coat
wt% Solids: 57.83 wt.%
Detackifier: polyamine/clay slurry detackifier at 1:3 ratio
Initial Charge: 300 ppm
pH: Adjusted to 9.5 With potassium hydroxide/caustic soda 50% mercury cell
Maintenance ratio: 4:1 Paint:Product
Paint Spray Rate: 2 ml/min
Water recirculate Rate: 2 GPM
Paint concentration in water at scrubber section: 264 ppm Test 2

Paint: PPG URC-1000 clear coat
Wt.% solids—57.83%
Detackifier: Melamine-formaldehyde polymer/polyvinyl alcohol blend and polystyrene-acrylate latex at 3:1 ratio on active basis
Initial detackifier Charge: 250 ppm
pH: Adjusted to 9.5 With potassium hydroxide/caustic soda 50% mercury cell
Maintenance ratio: 12:1 Paint:Product
Paint Spray Rate: 2 ml/min
Water recirculate Rate: 2 GPM
Paint conc. in water at scrubber section: 264 ppm Test 3

Paint: PPG URC-1000 clear coat
Wt.% solids—57.83%, % Ash 2.77%
Detackifier: polyamine and bentonite clay slurry at 1:3 ratio on active basis
Initial Detackifier Charge: 200 ppm
pH: Adjusted to 9.5 With potassium hydroxide/caustic soda 50% mercury cell
Maintenance ratio: 25:1 Paint:Product
Paint Spray Rate: 0.5 lb/min
Water recirculate Rate: 400 GPM
Total pit capacity: 1500 gallons
Air Velocity 10,000 CFM

| | |
| --- | --- |
| Total sludge produced: | 193.416 × 25% solids = 48,35 |
| Total Solids loading: | 81.2 × 57.83% + 23.2 × 0.10% = 52.74 + 2.32 = 55.06 |
| Sludge recovery rate | 48.35 = 88% |

Test 4

Paint: PPG URC-1000 clear coat
Wt.% solids: 57.83%
Detackifiers melamine-formaldehyde polymer/polyvinyl alcohol blend and polystyrene-acrylate latex at 3:1 ratio
Initial Detackifier charge: 300 ppm
pH: Adjusted to 9.5 with potassium hydroxide/caustic soda 50% mercury cell
Spray booth conditions: Same as Test 3
Maintenance ratio: 33:1

Test 5

Paint: PPG DCT-3000 clear coat. OCT-3000 is a trademark of PPG Industries for acrylic, melamine-ester clear coat composition
Wt.% solids: 55
Spray Rate: 5.4 ml/min
Water recirculation rate: 1 GPM
Product use: melamine formaldehyde polymer/PVA and polystyrene acrylic 2:1 ratio
Initial Charge: 1,000 ppm
Maintenance Charge: 14:1 paint:product
pH: 9.0–9.5

Test 6

Paint: InMont E176CE015 clear coat. InMont E176CE015 is a trademark of BASF InMont for acrylic-melamine polyester clear coat composition
Wt.% Solids: 50
Spray Rate: 5.4 ml/min
Water recirculation rate: 1 GPM
Product use: melamine formaldehyde polymer/PVA
Initial charge: 1,000 ppm
Maintenance Charge: 18:1 paint:product
pH: 9.0–9.5

Test 7

Paint: InMont U28AE125 Primer. InMont U28AE125 is a trademark of BASF InMont for high solid primer composition
Wt.% solids: 50
Spray Rate: 2 ml/min
Water recirculation rate: 2 GPM
Product use: melamine formaldehyde polymer/PVA
Initial Charge: 150 ppm
Maintenance Charge: 40:1 paint:product Test 8

Paint: InMont High Solids Enamel
Wt.% solids: 40
Spray Rate: 2.0 ml/min

Water recirculation rate: 2 GPM
Product use: melamine formaldehyde polymer/PVA
Initial Charge: 25 ppm
Maintenance Charge: 200:1 paint:product Test 9

Paint: InMont E14CK008 clear coat. InMont E14CK008 is a trademark of BASF InMont for rigid clear coat composition
Wt.% solids: 50
Spray Rate: 2 ml/min
Water recirculation rate: 2 GPM
Product use: from 2.5:1 ratio to 4.5:1 ratio also melamine formaldehyde/PVA (polyvinyl alcohol) only all performed good
Initial Charge: 150 ppm
Maintenance Charge: 20:1 paint:product Test 10

Paint: InMont E14CK001 clear coat. InMont E14CK008 is a trademark of BASF InMont for rigid clear coat composition
Wt.% solids: 40
Spray Rate: 2 ml/min
Water recirculation rate: 2 GPM
Product use: from 2.5:1 ratio to 4.5:1 ratio also melamine formaldehyde/PVA only all performed good
Initial Charge: 25 ppm
Maintenance Charge: 40:1 paint:product

Test results conducted at Plant A—Results & Discussions

Melamine formaldehyde/polyvinyl alcohol is, for purposes of this discussion, designated Product A. Styrene-acrylate is, for purposes of this discussion, designated Product B. Feed dosages are given on an active basis.

The sludge pit at Plant was cleaned and filled with fresh water. Due to residual sludge in the system, the water had 1,000–2,000 ppm suspended solids.

A total of 125 ppm of A/B (149 lb. A, 40.16 lb. B-25 ppm for clean up and 100 ppm for intial charge) was charged in the system. Based on water turbidity readings, the residual chemicals had dropped from 100 ppm to 30 ppm within two hours. A maintenance charge of 8 lb/hr A and 2.38 lb/hr B was added starting at 8:30 AM. At 2:40 PM, the residual chemicals were built back up to 50 ppm at which time, the paint spray line was done for the day. Judging the quality of the paint sludge that came over the rotostrainers, the paint kill went from borderline at 10:30 AM to very good at 2:40 PM. The sludge that was removed at the Hoffman filter remained excellent throughout the day. The A/B ratio was at 3.36:1.

On Day 2, the feed rate of A/B was adjusted to 3:1. Throughout the day, the sludge was excellent and the rotostrainer looked good.

On Day 3, the feed rate of A/B was adjusted to 4.25:1 (8 lb/hr A, 1.87/lb/hr B). Water started to get dirtier and the floc in the water was also larger. The feed rate of 4.25:1 remained through the day. The sludge was not quite as effectively killed as it was on the previous days.

On Day 4. Based on the relatively poor experience on Day 3, the A/B feed rate was adjusted back to 3.25:1 at 8 lb/hr A and 2.58 lb/hr B on themselves and the sludge at Hoffman Filter was also much better killed.

The sludges collected at both Hoffman Filters were submitted for XRF (X-Ray Fluorescence). The Ca content in the sludge was high for the first ten days and dropped significantly after that. Since the sludge collected in the laboratory Binks Booth also had high Ca content, it was suggested that the major source of Ca was from water. The sludge analysis further verified that Ca in the sludge was from the make-up water.

Discussion of Test Results

Generally, we have found that the laboratory test results have higher detackifier requirements than are actually needed in the field. A discrepancy occurs primarily due to difference in spray rate vs. water flow rate under laboratory and field conditions.

In practice, the polymer works best when dosed in a system having a pH within the range of 7.5 to 9.5.

Generally, the system should be dosed prior to the detackification process. Pre-dosing appears to allow the formation of floc and adequate dispersion of the detackifier throughout the system.

Preferably, floc within the range of $0.1 \sim 1\mu$ micron will be formed. Generally floc with the range of 0.5–0.75 microns is found to be most desirable.

The detackifying systems are generally water containing the detackifier compositions.

The detackifier of this invention is a floating/sinking depending on the ratio of the two components, A/B.

The detackifier bonds with paint and removes the stickiness of the paint. Generally, when the invention is working and is appropriately dosed there will be no stickiness to the feel and no paint adhering to any surfaces that come in contact with water and filtration commonly used in paint detackification removal systems.

Having thus described my invention, we claim the following:

1. A paint spray booth paint detackifying composition comprising a paint detackifying amount of a melamine-formaldehyde resin-polyvinyl alcohol polymer mixture in the water of a paint spray booth collection system.

2. The composition of claim 1 wherein said melamine-formaldehyde resin and said polyvinyl alcohol are present in a ratio of at least 2.4:1 to 5.5:1 weight ratio based on actives.

3. The composition of claim 1 wherein the melamine-formaldehyde resin and said polyvinyl alcohol are present in a ratio of no more than 3.0:1 to 4.0:1 weight ratio based on actives.

4. A method for detackifying paint in a paint spray booth comprised of the steps of treating the water in a paint spray booth collection system with at least 25 ppm of a composition comprising a melamine-formaldehyde resin polyvinyl alcohol polymer mixture.

5. A method for detackifying paint in a paint spray booth comprised of the steps of treating the water in a paint spray booth collection system with at least 25 ppm of a composition comprising a melamine-formaldehyde resin and polyvinyl alcohol polymer mixture present in a ratio of at least 2.4:1 to 5.5:1 weight ratio based on actives.

6. A method for detackifying paint in a paint spray booth comprised of the steps of treating the water in a paint spray booth collection system with at least 25 ppm of a composition comprising a melamine-formaldehyde resin and polyvinyl alcohol polymer mixture present in a ratio of to more than 3.0:1 to 4.0:1 weight ratio based on actives.

7. The composition of claim 2 further including styrene-acrylate polymers having a molecular weight within the range of 50,000–100,000.

8. The composition of claim 7 wherein said polyvinyl alcohol to said melamine-formaldehyde resin to said styrene-anionic acrylate polymer is within the range of 0.7:2.4:1 to 1.32:4.5:1 weight ratio based on actives.

9. A method for detackifying paint in a paint spray booth comprised of the steps of treating the water in a paint spray booth collection system with at least 25 ppm of a composition comprising a mixture of melamine-formaldehyde resin, polyvinyl alcohol, and styrene-acrylate polymer, wherein said melamine-formaldehyde resin and said polyvinyl alcohol are present in a weight ratio of at least 2.4:1 to 5.5:1 based on actives, and the molecular weight of the styrene acrylate polymer is within the range of 50,000–100,000.

10. A method for detackifying paint in a paint spray booth comprised of the steps of treating the water in a paint spray booth collection system with at least 25 ppm of a composition comprising a polyvinyl alcohol, melamine-formaldehyde resin, styrene acrylate polymer mixture having a weight ratio within the range of 0.7:2.4:1 to 1.32:4.5:1, respectively, and the molecular weight of the styrene-acrylate polymer is within the range of 50,000–100,000.

* * * * *